Nov. 18, 1941.  E. J. PROTIN  2,263,223
THREAD PROTECTOR
Filed March 12, 1940
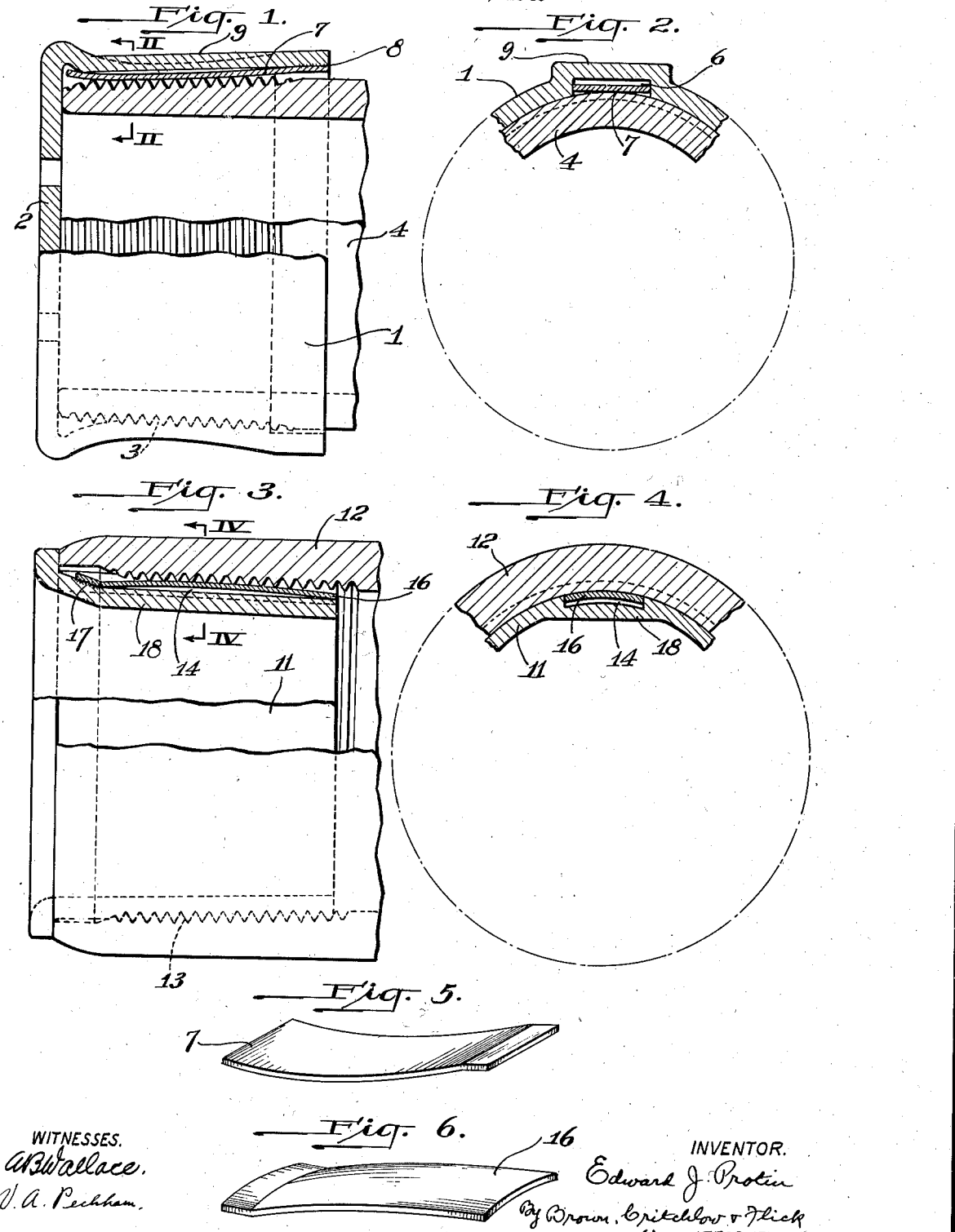

Patented Nov. 18, 1941

2,263,223

UNITED STATES PATENT OFFICE 2,263,223

THREAD PROTECTOR

Edward J. Protin, Charleroi, Pa., assignor to Pittsburgh Steel Company, Pittsburgh, Pa., a corporation of Pennsylvania Application March 12, 1940, Serial No. 323,544

3 Claims. (Cl. 138—96)

This invention relates to pipe thread protectors, and more particularly to protectors adapted to be screwed onto or into the threaded end of a pipe.

It is among the objects of this invention to provide a pipe thread protector of this character which has means for frictionally engaging the pipe threads to prevent it from working off the end of the pipe, which is a unitary device, which can be readily applied and removed, and which is of simple and inexpensive construction.

In accordance with this invention, a protective sleeve is provided on one surface of its side wall with a projection, preferably a thread, adapted to register with the thread of a pipe to permit the sleeve to be screwed thereon or therein, depending upon whether the pipe is threaded externally or internally. This same surface of the sleeve is also provided with a recess in which there is a resilient member that is adapted to be compressed between the sleeve and the pipe thread. Preferably, the recess extends axially of the sleeve, and the resilient member therein is a longitudinally bowed elongated member such as a leaf spring or wire. One end of the spring is permanently attached to the sleeve so that only one element has to be handled in connecting this protector to a pipe. The pressure of the spring on the pipe thread creates enough friction between that thread and the spring to practically eliminate the danger of the protector vibrating or working off the pipe in handling or in transit.

The invention is illustrated in the accompanying drawing, in which Fig. 1 is a side view, partly in section, of my outside protector mounted on the end of a pipe; Fig. 2 is a fragmentary transverse section taken on the line II—II of Fig. 1; Figs. 3 and 4 are views similar to Figs. 1 and 2, respectively, of my invention as applied to an inside pipe thread protector; and Figs. 5 and 6 are perspective views of the resilient members shown in Figs. 1 and 3, respectively.

Referring to Figs. 1 and 2 of the drawing, the annular member or sleeve 1 is open at one end and may also be open at the other end or it may be closed by an end wall 2 as shown. Being an outside thread protector, the inner surface of the sleeve's side wall is provided with a thread 3 so that the sleeve can be screwed onto the threaded end of a pipe 4 in the conventional manner.

It is a feature of this invention that whether or not the sleeve is screwed its entire distance onto a pipe it is held against accidental unscrewing, such as might occur in handling or from vibrations while in transit. Accordingly, the inner surface of the sleeve's side wall is provided with at least one recess 6 extending axially of the sleeve through its threads, and in this recess a resilient member 7 is mounted. Preferably, this member is an elongated member, a leaf spring for example (Fig. 5), which is bowed or arched longitudinally sufficiently when uncompressed to project radially out of the sleeve recess. Therefore, when the sleeve is screwed onto a pipe, as shown in Fig. 1, the spring is compressed between the wall of the recess and the crest of the pipe thread. The pressure of the spring on the pipe thread creates enough friction to prevent the sleeve from working loose even though it is not screwed tightly thereon. The shape of the spring is such that it engages the pipe thread with substantially the same pressure for the full length of its engagement.

To permit the spring and sleeve to be handled as a unit so that the spring can be applied to and removed from the pipe with the sleeve, one end of the spring is secured to the sleeve, preferably by a weld 8 at the inner end of the sleeve. The opposite end of the spring is free and unattached.

As best shown in Fig. 2 the sleeve recess 6 is most suitably formed by offsetting outwardly a portion 9 of the sleeve wall so that the wall thickness is preserved. This offset portion also serves as a projection that can be engaged by a wrench for screwing the protector onto or off the pipe.

The embodiment of the invention shown in Figs. 3, 4 and 6 involves the same principles of construction as the one just described, but the arrangement of elements is altered sufficiently to permit the protector to be used for protecting the inside threads of a pipe. Accordingly, a sleeve 11, which is adapted to be inserted in the end of an inside threaded pipe 12, is provided on the outer surface of its side wall with a thread 13 which registers with the pipe thread. The outer surface of the sleeve is provided with at least one axially extending recess 14 in which a resilient member 16 is mounted. Like the first embodiment, this resilient member may be a leaf spring or the like which is bowed longitudinally sufficiently to cause it to be compressed between the sleeve and pipe thread when the sleeve is in protecting position, as shown in Fig. 3.

The spring is secured to the sleeve, preferably by a weld 17 at its outer end, but its inner end is left free. To prevent the longitudinal edges of the spring from cutting into the pipe thread the spring is curved transversely, as shown in Figs. 4 and 6, so that its outer surface engages substantially flat against the crest of the pipe thread. The portion of the side wall of the sleeve below recess 14 is offset inwardly and formed wtih a flat inner surface 18 which can be engaged by a tool for screwing the sleeve into or out of the pipe.

The simplicity of the thread protectors disclosed herein will be apparent, yet they are dependable because they are, in effect, locked onto pipes. The friction lock is in itself simple but effective, but as it is permanently attached to the protector sleeve there are no extra parts to handle and to become lost. The lock functions automatically when the sleeve is applied to the pipe end, so no time is spent in applying a separate locking member. These protectors are relatively inexpensive to make because all that is required is the provision in a protective threaded sleeve of an axial recess in which a spring is mounted.

According to the provisions of the patent statutes, I have explained the principle and construction of my invention and have illustrated and described what I now consider to represent its best embodiments. However, I desire to have it understood that, within the scope of the appended claims, the invention may be practiced otherwise than as specifically illustrated and described.

I claim:

1. A thread protector for a pipe having a continuous thread, said protector comprising a threaded sleeve adapted to be screwed onto the pipe thread and provided in its threaded surface with a recess extending axially thereof, and a resilient member disposed in said recess and adapted to be compressed between the sleeve and the thread of said pipe, said resilient member being bowed away from the sleeve in a single continuous curve extending substantially the full length of the resilient member, said member being so formed as to exert a substantially uniform pressure on said thread throughout the length of its engagement therewith.

2. A thread protector for a pipe having a continuous thread, said protector comprising a threaded sleeve adapted to be screwed onto the pipe thread and provided in its threaded surface with a recess extending axially thereof, the sleeve thread being adapted to register with the pipe thread substantially throughout the length of the latter, and an elongated longitudinally arched spring member disposed in said recess and adapted to be compressed between the sleeve and the thread of said pipe, said spring member being bowed away from the sleeve in a single continuous curve extending substantially the full length of the spring member.

3. An inside thread protector for a pipe having an inside continuous thread, said protector comprising an externally threaded sleeve adapted to be screwed into the threaded pipe and provided in its threaded surface with a recess extending axially thereof, and a transversely curved leaf spring disposed in said recess and adapted to be compressed between the sleeve and the thread of said pipe, said spring being bowed away from the sleeve in a single continuous curve extending substantially the full length of the spring.

EDWARD J. PROTIN.